T. R. EVANS.
Boot and Shoe Trees and Stretchers.

No. 141,550. Patented August 5, 1873.

Witnesses: Harry Smith, Thomas McSwain

Thos. R. Evans
By his Attys.
Howson and Son

UNITED STATES PATENT OFFICE.

THOMAS R. EVANS, OF PHILADELPHIA, PENNSYLVANIA.

IMPROVEMENT IN BOOT AND SHOE TREES AND STRETCHERS.

Specification forming part of Letters Patent No. 141,550, dated August 5, 1873; application filed June 19, 1873.

*To all whom it may concern:*

Figure 1:
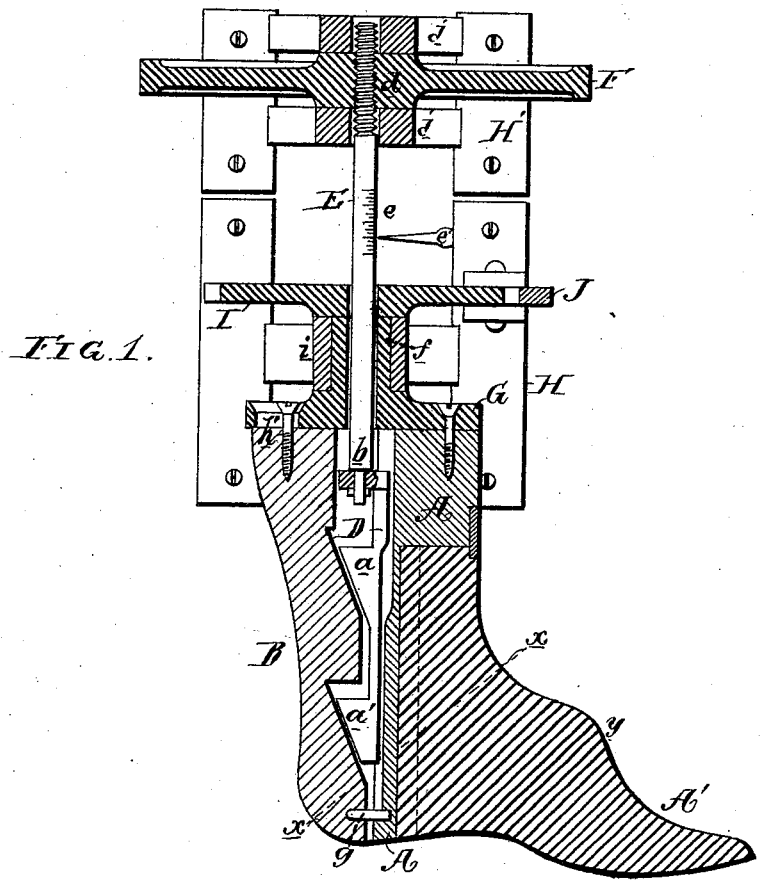

Be it known that I, THOMAS R. EVANS, of Philadelphia, Pennsylvania, have invented a Combined Boot and Shoe Tree and Stretcher, of which the following is a specification:

The object of my invention is a strong and readily-manipulated apparatus for "treeing" and stretching boots and shoes, the principal features of which are shown in the sectional plan view, Figure 1 of the accompanying drawing, and consist of two sections, A and B, capable of being spread apart from each other by wedges $a\ a'$ on a bar, D, swiveled at $b$ to a screw-rod, E, to which a longitudinal movement can be imparted by a nut, $d$, on a hand-wheel, F, a scale, $e$, on the rod indicating the extent of its movement, and, consequently, the degree to which the sections of the tree or last are separated, and the said rod passing through the journal $f$ of the tree, upon and with which the latter can be turned without interfering with the operation of the wedges.

Figure 2:
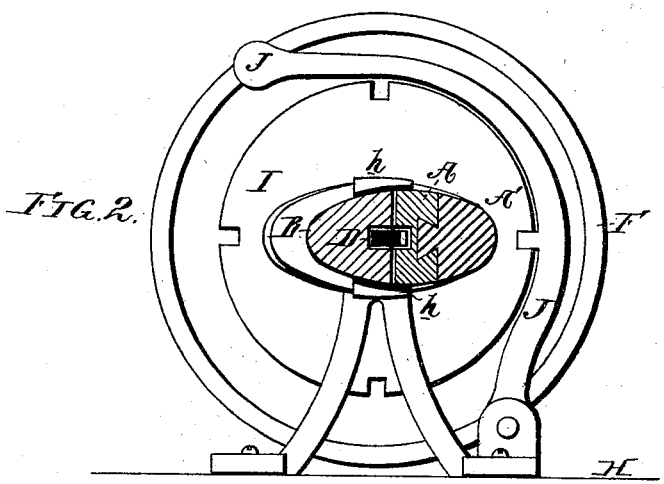

The apparatus is constructed for attachment to the edge of a work-bench or table, which the tree should overhang. The section A of the tree is permanently secured to a plate, G, and the adjustable section B is guided partly by a pin, $g$, and side plates $h\ h$ on the section A, shown in the transverse section, Fig. 2 of the drawing, and partly by a screw or pin, $h'$, adapted to a slot in the supporting-plate G. The journal $f$ forms a permanent part of the plate G, and is adapted to a bearing, $i$, in a fixed standard or frame, H, upon which the tree can be freely turned, a notched disk, I, being secured to the end of the journal, and serving, with a lever, J, to retain the revolving tree in any position to which it is adjusted, as fully described in Letters Patent No. 119,131, granted to me on the 19th day of September, 1871.

The sections A and B of the tree are spread apart, for the purpose of stretching a boot or shoe adapted to the same, by the simple longitudinal movement of the bar D and its wedges $a\ a'$, this movement being obtained by simply turning the hand-wheel and nut F, and thus operating the screw-rod E, to which the said bar D is directly attached. The screw-rod passes through and is partly sustained by bearings $j\ j$ on a fixed standard, H', between which the operating-nut is confined.

A reverse movement of the nut and hand-wheel, after the stretching operation, draws back the screw-rod, bar D, and wedges, and thus enables the sections of the tree to be brought together, and the stretched boot or shoe to be withdrawn from the same.

The swiveled joint $b$, between the bar D and screw-rod, enables the revolving tree to be turned to the most convenient position for operating upon the work without interfering with the said bar D and wedges, which turn with and accommodate themselves to the angle of the tree. For an ordinary fixed tree, however, the connection between the bar D and screw-rod might be rigid.

For the purpose of enabling the degree of stretch imparted to a boot or shoe to be accurately determined, I propose to make a scale, $e$, upon the screw-rod, and to combine a fixed pointer, $e'$, with the same, as shown in Fig. 1, or vice versa, the graduations of the scale, when opposite the pointer, indicating the several measurements at, say, the point $x$ on the tree, and thus enabling the operator to perform the work with some degree of accuracy.

A detachable toe-piece, A', is adapted to the section A of the tree, and this toe-piece should be of a size to accord with the shoe, which has to be treed or stretched, and it should have projections or enlargements at those points particularly which have to be stretched to the greatest extent—the instep $y$, for instance.

I claim as my invention—

1. The tree or last consisting of a fixed and a movable section arranged to revolve, as described, in combination with the swiveled screw-rod E, wedge-bar D, and operating-nut, and hand-wheel $d$ F, as set forth.

2. The combination, substantially as described, of a scale and pointer with the operating screw-rod E of a boot and shoe stretcher, for the purpose specified.

In testimony whereof I have signed my name to this specification in the presence of two subscribing witnesses.

THOS. R. EVANS.

Witnesses:
WM. A. STEEL,
HUBERT HOWSON.